US011317363B2

(12) United States Patent
Siomina et al.

(10) Patent No.: US 11,317,363 B2
(45) Date of Patent: Apr. 26, 2022

(54) SYSTEMS AND METHODS RELATING TO TRANSMISSION TIMING DIFFERENCE IN A MULTI-CARRIER SYSTEM UNDER UL CCA

(71) Applicant: TELEFONAKTIEBOLAGET L M ERICSSON (PUBL), Stockholm (SE)

(72) Inventors: Iana Siomina, Täby (SE); Muhammad Kazmi, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 16/304,118

(22) PCT Filed: Apr. 11, 2017

(86) PCT No.: PCT/IB2017/052093
§ 371 (c)(1),
(2) Date: Nov. 21, 2018

(87) PCT Pub. No.: WO2017/203374
PCT Pub. Date: Nov. 30, 2017

(65) Prior Publication Data
US 2020/0329447 A1 Oct. 15, 2020

Related U.S. Application Data

(60) Provisional application No. 62/340,196, filed on May 23, 2016.

(51) Int. Cl.
H04W 56/00 (2009.01)
H04W 74/08 (2009.01)
(52) U.S. Cl.
CPC ..... H04W 56/0005 (2013.01); H04W 56/003 (2013.01); H04W 74/0808 (2013.01)

(58) Field of Classification Search
CPC .......... H04W 56/003; H04W 56/0005; H04W 74/0808
See application file for complete search history.

(56) References Cited

U.S. PATENT DOCUMENTS 10,440,725 B2 * 10/2019 Ahn .................. H04W 56/00
2015/0103782 A1 * 4/2015 Xu .................... H04W 16/14
370/329
(Continued)

FOREIGN PATENT DOCUMENTS

CN 105379401 A 3/2016
CN 105453478 A 3/2016
(Continued)

OTHER PUBLICATIONS

Huawei et al. "Discussion on eLAA RRM impact", 3GPP TSG-RAN WG4 Meeting #78bis, R4-162429, San Jose del Cabo, Mexico, Apr. 11-15, 2016.
(Continued)

Primary Examiner — Saad A. Waqas
(74) Attorney, Agent, or Firm — Withrow & Terranova, PLLC

(57) ABSTRACT

Systems and methods relating to a transmission timing difference between cells in a multi-carrier system in which at least one of the cells is subject to Clear Channel Assessment (CCA) before transmitting are disclosed. In some embodiments, a method of operation of a User Equipment (UE) comprises determining a transmission timing difference between a first cell that operates on a first carrier and a second cell that operates on a second carrier, wherein CCA is required to be performed on at least one of a first channel in which the first carrier is located and a second channel in which the second carrier is located before the UE is permitted to transmit. The method further comprises using the transmission timing difference for one or more operational
(Continued)

OBTAIN REQUIREMENT(S) OR CONDITION(S) RELATED TO TRANSMISSION TIMING DIFFERENCE Δ FOR A PAIR OF CELLS/CARRIERS WHEN A FIRST CHANNEL AND A SECOND CHANNEL ARE AVAILABLE FOR TRANSMISSION OF UPLINK SIGNALS ON CELL 1 AND CELL 2, RESPECTIVELY
200

↓

CONTROL ONE OR MORE FACTORS IMPACTING THE TRANSMISSION TIMING DIFFERENCE Δ OR THE APPLICABILITY OF THE OBTAINED REQUIREMENT(S) WHEN AT LEAST ONE OF THE CELLS/CARRIERS IS SUBJECT TO UL LBT TO AVOID OR REDUCE THE RISK OF THE TRANSMISSION TIMING DIFFERENCE Δ EXCEEDING A THRESHOLD
202 tasks of the UE. The transmission timing difference is determined when the first channel and the second channel are available at the UE.

26 Claims, 7 Drawing Sheets

(56) References Cited

U.S. PATENT DOCUMENTS

| | | | |
|---|---|---|---|
| 2015/0327198 A1* | 11/2015 | Axmon | H04L 5/001 370/336 |
| 2016/0057752 A1* | 2/2016 | Ahn | H04W 56/004 370/329 |
| 2017/0230944 A1* | 8/2017 | Babaei | H04W 72/14 |
| 2017/0332358 A1* | 11/2017 | Park | H04W 72/042 |
| 2017/0346685 A1* | 11/2017 | Wang | H04L 5/0091 |
| 2017/0367058 A1* | 12/2017 | Pelletier | H04W 52/246 |
| 2018/0124611 A1* | 5/2018 | Moon | H04W 72/0453 |
| 2018/0139701 A1* | 5/2018 | Wang | H04W 52/146 |
| 2018/0199353 A1* | 7/2018 | Ahn | H04W 74/08 |
| 2018/0220459 A1* | 8/2018 | Park | H04W 48/10 |
| 2018/0302915 A1* | 10/2018 | Einhaus | H04W 72/1215 |

FOREIGN PATENT DOCUMENTS

| | | |
|---|---|---|
| RU | 2467503 C2 | 11/2012 |
| WO | 2013/023354 A1 | 2/2013 |
| WO | 2015/174905 A1 | 11/2015 |

OTHER PUBLICATIONS

NTT Docomo, Inc., "Discussion on PRACH for eLAA UL", 3GPP TSG RAN WG1 Meeting #84bis, R1-162803, Busan, Korea, Apr. 11-15, 2016.
Author Unknown, "Technical Specification Group Radio Access Network; Evolved Universal Terrestrial Radio Acces (E-UTRA); Physical channels and modulation (Release 13)," Technical Specification 36.211, Version 13.1.0, Mar. 2016, 3GPP Organizational Partners, 155 pages.
Author Unknown, "Technical Specification Group Radio Access Network; Evolved Universal Terrestrial Radio Access (E-UTRA); Requirements for support of radio resource management (Release 13)," Technical Specification 36.133, Version 13.3.0, Mar. 2016, 3GPP Organizational Partners, 1,581 pages.
Decision to Grant for Russian Patent Application No. 2018145213/07, dated Jun. 25, 2019, 7 pages.
First Office Action for Chinese Patent Application No. 201780031586.X, dated Jul. 3, 2020, 10 pages.
Notice of Reasons for Refusal for Japanese Patent Application No. 2018-560106, dated Sep. 24, 2019, 6 pages.
International Search Report and Written Opinion for International Patent Application No. PCT/IB2017/052093, dated Jul. 7, 2017, 13 pages.
Ericsson, "RRM requirements impact with eLAA", 3GPP TSG RAN WG4 Meeting #79, R4-163329, May 23-27, 2016.
Huawei et al., "UE behavior in DC when the maximum uplink timing difference is larger than T_threshold", 3GPP TSG RAN WG1 Meeting #81, R1-152445, May 25-29, 2015.
Huawei et al., "CR on maximum Transmission Timing Difference in eLAA", 3GPP TSG-RAN WG4 Meeting #79, R4-164582, May 23-27, 2016.

* cited by examiner

SYSTEMS AND METHODS RELATING TO TRANSMISSION TIMING DIFFERENCE IN A MULTI-CARRIER SYSTEM UNDER UL CCA

RELATED APPLICATIONS

This application is a national stage application of International Patent Application No. PCT/IB2017/052093, filed Apr. 11, 2017, which claims the benefit of provisional patent application Ser. No. 62/340,196, filed May 23, 2016, the disclosures of which are hereby incorporated herein by reference in their entirety.

This application claims the benefit of provisional patent application Ser. No. 62/340,196, filed May 23, 2016, the disclosure of which is hereby incorporated herein by reference in its entirety.

TECHNICAL FIELD

The present disclosure relates to obtaining and using uplink transmission timing difference in multi-carrier system utilizing Carrier Aggregation (CA) in which at least one carrier is subject to Clear Channel Assessment (CCA) (e.g., Listen-Before-Talk (LBT)) before transmitting.

BACKGROUND

Multi-Carrier Systems

In multi-carrier or Carrier Aggregation (CA) operation, the User Equipment (UE) is able to receive and/or transmit data to more than one serving cell. In other words, a CA capable UE can be configured to operate with more than one serving cell. The carrier of each serving cell is generally called a Component Carrier (CC). In simple words, the CC means an individual carrier in a multi-carrier system. The term CA is also called (e.g., interchangeably called) "multi-carrier system," "multi-cell operation," "multi-carrier operation," and "multi-carrier" transmission and/or reception. This means that CA is used for transmission of signaling and data in the uplink and downlink directions. One of the CCs is the Primary CC (PCC), or simply the primary carrier, and may also be referred to as an anchor carrier. The remaining CCs are called Secondary CCs (SCCs) or simply secondary carriers or even supplementary carriers. The serving cell is interchangeably called a Primary Cell (PCell) or Primary Serving Cell (PSC). Similarly, the secondary serving cell is interchangeably called a Secondary Cell (SCell) or Secondary Serving Cell (SSC).

Generally, the primary or anchor CC carries the essential UE specific signaling. The primary CC, which is also known as the PCC or PCell, exists in both uplink and downlink directions in CA. In case there is a single uplink CC, the PCell is obviously on that CC. The network may assign different primary carriers to different UEs operating in the same sector or cell.

In Dual Connectivity (DC) operation, the UE can be served by at least two nodes called the Master enhanced or evolved Node B (eNB) (MeNB) and the Secondary eNB (SeNB). More generally, in multiple connectivity, which is also known as multi-connectivity, operation, the UE can be served by two or more nodes, e.g. MeNB, SeNB1, and SeNB2 and so on. The UE is configured with the PCC from both the MeNB and the SeNB. The PCells from the MeNB and the SeNB are called PCell and Primary Secondary Cell (PSCell), respectively. The PCell and the PSCell operate the UE typically independently. The UE is also configured with one or more SCCs from each of the MeNB and the SeNB. The corresponding SSCs served by the MeNB and the SeNB are called SCells. The UE in DC typically has separate Transmitters/Receivers (TX/RX) for each of the connections with the MeNB and the SeNB. This allows the MeNB and the SeNB to independently configure the UE with one or more procedures, e.g. Radio Link Monitoring (RLM), Discontinuous Reception (DRX) cycle, etc. on their PCell and PSCell respectively.

A multi-carrier system may involve carriers in licensed and/or unlicensed spectrum.

License Assisted Access (LAA) and Frame Structure Type 3 (FS3)

LAA, or operations based on FS3 specified in Third Generation Partnership Project (3GPP) Technical Specification (TS) 36.211, which was introduced in Long Term Evolution (LTE) Release 13, refers to the UE operation on at least one carrier in unlicensed spectrum such as Band 46 that is also used for WiFi access. For example, a UE can be configured with CA with a PCell in Band 1, which is in a licensed spectrum, and an SCell in Band 46, which is in an unlicensed spectrum. An eNB operating in the unlicensed band only transmits signals which may be used for UE measurements using so called Discovery Reference Symbols (DRSs). Unlike Release 8 Common Reference Symbols (CRSs), DRS is not transmitted in every subframe, and is instead transmitted periodically (e.g., every 160 milliseconds (ms)). Moreover, the eNB may perform so called Listen-Before-Talk (LBT) procedures to check that no other node, such as another eNB or a WiFi access point, is transmitting in the unlicensed spectrum before it transmits DRS. This means that, from a UE perspective, the eNB may be unable to transmit any particular DRS transmission. In certain regions, LBT functionality is required from a regulatory point of view to ensure fair coexistence of different radios and access technologies on the unlicensed band.

In Release 14, in addition to the downlink operation in the unlicensed spectrum as described above, uplink operation is also being introduced. This means that a UE may be configured with uplink transmissions on one or more SCells in the unlicensed spectrum and perform uplink LBT if needed.

LBT

According to the LBT procedure, the transmitter in unlicensed spectrum (e.g., the eNB or base station in case of downlink or the UE in case of uplink) needs to listen on the carrier before it starts to transmit. If the medium is free, the transmitter can transmit, which is sometimes referred to as LBT being successful. Conversely, if the medium is busy, e.g. some other node is transmitting, the transmitter cannot transmit, which is sometimes referred to as LBT being unsuccessful or failing, in which case the transmitter can try again at a later time. Therefore, the LBT procedure enables a Clear Channel Assessment (CCA) check before using the channel. Based on the CCA, if the channel is found to be clear, then the LBT is considered to be successful. But if the channel is found to be occupied, then the LBT is considered to be failure, which is also known as LBT failure. The LBT failure requires the network node not to transmit signals in the same and/or subsequent subframes. Exact subframes and also the number of subframes where transmission is forbidden depends on the specific design of the LBT scheme.

Due to LBT, a transmission in an unlicensed band may be delayed until the medium becomes free again. In case there is no coordination between the transmitting nodes, which often is the case, the delay may appear random.

In the simplest form, LBT is performed periodically with a period equal to certain units of time; as an example, one unit of time duration, i.e. 1 Transmit Time Interval (TTI), 1 time slot, 1 subframe, etc. The duration of listening in LBT is typically on the order of few to tens of microseconds (μs). Typically, for LBT purposes, each LTE subframe is divided in two parts: the listening takes place in the first part and data is transmitted in the second part if the channel is seen to be free. The listening occurs at the beginning of the current subframe and determines whether or not data transmission will continue in this subframe and a few subsequent subframes. Hence, the data transmission in a subframe P until subframe P+n is determined by the outcome of listening during the beginning of subframe P. The number n depends on system design and/or regulatory requirements.

FIG. 1 illustrates an example sequence of different stages related to the LBT procedure, where "s" is the sensing time period. In FIG. 1, if the channel is determined to be busy, after some deferral time, the UE may try again to sense on the channel in order to determine whether the channel is available. If the channel is determined to be available, after some backoff time, the UE may start transmitting an uplink burst during the UE's channel occupancy time but for no longer than the Maximum Channel Occupancy Time (MOOT) which can be, e.g., up to 10 ms, depending on the region.

Maximum Uplink Transmission Timing Difference in LTE General CA

A UE adjusts its transmission timing based on a Timing Advance (TA) command received from the network and may also perform autonomous transmission timing adjustment.

When the timing adjustment based on a received TA command leads to excessive transmission timing difference (i.e., exceeds the maximum transmission timing difference requirement) between two TA Groups (TAGs) (Primary TAG (pTAG) and Secondary TAG (sTAG) or any two sTAGs), the UE is allowed to stop its transmission as can be seen below from the text in the current standard. The maximum transmission timing difference requirement between two TAGs is 32.47 μs for inter-band and intra-band CA.

===== from TS 36.133 V13.3.0, Section 7.9.2:=====
A UE configured with pTAG and sTAG may stop transmitting on the SCell if after timing adjusting due to received TA command the uplink transmission timing difference between PCell and SCell exceeds the maximum value the UE can handle as specified above.
. . . .
A UE configured with two sTAGs may stop transmitting on the SCell if after timing adjusting due to received TA command the uplink transmission timing difference between SCell in one sTAG and SCell in other sTAG exceeds the maximum value the UE can handle as specified above.

DC

In DC, a UE is configured with pTAG and Primary Secondary TAG (psTAG). The pTAG shall contain the PCell and may also contain one SCell, if configured. The psTAG shall contain the PSCell and may also contain one SCell, if configured.

The UE shall be capable of handling a maximum uplink transmission timing difference between the PCell and the PSCell of at least 35.21 μs provided the UE indicates that it is capable of synchronous DC. The requirements for synchronous DC are only applicable for Time Division Duplex (TDD)-TDD, Frequency Division Duplex (FDD)-FDD, and TDD-FDD inter-band DC.

The UE shall be capable of handling a maximum uplink transmission timing difference between the PCell and the PSCell of at least 500 μs provided the UE indicates that it is capable of asynchronous DC. The requirements for asynchronous DC are only applicable for FDD-FDD and inter-band DC.

If the UE is configured with higher layer parameter powerControlMode<1>, then the UE may stop transmission on the PSCell if the uplink transmission timing difference exceeds 35.21 μs. If a UE supports both synchronous and asynchronous DC and if the UE is configured with higher layer parameter powerControlMode<2>, then the UE needs to constitute new subframe pairs if the uplink transmission timing difference exceeds 500 μs.

SUMMARY

Systems and methods relating to a transmission timing difference, $\Delta$, between cells in a multi-carrier system in which at least one of the cells is subject to Clear Channel Assessment (CCA) before transmitting are disclosed. In some embodiments, a method of operation of a User Equipment (UE) comprises determining a transmission timing difference, $\Delta$, between a first cell that operates on a first carrier and a second cell that operates on a second carrier, wherein CCA is required to be performed on at least one of a first channel in which the first carrier is located and a second channel in which the second carrier is located before the UE is permitted to transmit. The method further comprises using the transmission timing difference, $\Delta$, for one or more operational tasks of the UE. The transmission timing difference, $\Delta$, is determined when the first channel and the second channel are available at the UE for transmission of signals on the first cell and the second cell, respectively. By using the transmission timing difference, $\Delta$, where the transmission timing difference, $\Delta$, was determined when the first and second channels are available, the UE is able to ensure that the transmission timing difference, $\Delta$, is an accurate reflection of the actual transmission timing difference between the cells such that appropriate task(s) are performed.

In some embodiments, using the transmission timing difference, $\Delta$, for the one or more operational tasks of the UE comprises stopping transmission on at least one of the first cell and the second cell if the transmission timing difference, $\Delta$, is greater than a threshold.

In some embodiments, CCA is required to be performed on the first channel in which the first carrier is located before the UE is permitted to transmit on the first cell, CCA does not need to be performed on the second channel in which the second carrier is located before the UE is permitted to transmit on the second cell, and using the transmission timing difference, $\Delta$, for the one or more operational tasks of the UE comprises stopping transmission on the first cell if the transmission timing difference, $\Delta$, is greater than a threshold.

In some embodiments, CCA is required to be performed on the first channel in which the first carrier is located before the UE is permitted to transmit on the first cell, and using the transmission timing difference, Δ, for the one or more operational tasks of the UE comprises stopping transmission on the first cell if the transmission timing difference, Δ, is greater than a threshold.

In some embodiments, the first cell is configured as a secondary cell of the UE and the second cell is configured as a Primary Cell (PCell) of the UE.

In some embodiments, the first cell is configured as a Secondary Cell (SCell) of the UE and is in a first Timing Advance Group (TAG) and the second cell is configured as a PCell of the UE and is in a second TAG.

In some embodiments, the first cell is configured as a first SCell of the UE and is in a first TAG and the second cell is configured as a second SCell of the UE and is in a second TAG.

In some embodiments, determining the transmission timing difference, Δ, comprises determining the transmission timing difference, Δ, when both the first channel and the second channel are available for transmission by the UE on the first cell and the second cell, respectively.

In some embodiments, determining the transmission timing difference, Δ, comprises determining the transmission timing difference, Δ, after a CCA result for the at least one of the first channel and the second channel is known and the CCA result is that the at least one of the first channel and the second channel is available for transmission by the UE.

In some embodiments, determining the transmission timing difference, Δ, comprises not determining the transmission timing difference, Δ, after a CCA result for the at least one of the first channel and the second channel is known and the CCA result is that the at least one of the first channel and the second channel is not available for transmission by the UE.

In some embodiments, determining the transmission timing difference, Δ, comprises not determining the transmission timing difference, Δ, during a deferral time or during a backoff time for CCA.

In some embodiments, determining the transmission timing difference, Δ, comprises determining the transmission timing difference, Δ, during a channel occupancy time of the first cell and the second cell.

In some embodiments, determining the transmission timing difference, Δ, comprises adapting a time at which the transmission timing difference, Δ, is determined to one or more subframes for which a CCA result for the at least one of the first channel and the second channel is that the at least one of the first channel and the second channel is available for transmission by the UE.

In some embodiments, using the transmission timing difference, Δ, for the one or more operational tasks of the UE comprises performing at least one task if the transmission timing difference, Δ, is greater than a threshold and informing a network node that the UE has performed the at least one task.

In some embodiments, the method further comprises obtaining at least one requirement and/or condition for the transmission timing difference, Δ, for a pair of cells comprising the first cell on the first carrier and the second cell on the second carrier. Further, in some embodiments, determining the transmission timing difference, Δ, comprises determining the transmission timing difference, Δ, when the first channel and the second channel are available for transmission of signals on the first cell and the second cell, respectively, based on the at least one requirement and/or condition for the transmission timing difference, Δ, for the pair of cells comprising the first cell on the first carrier and the second cell on the second carrier.

In some embodiments, the method further comprises determining a need for determining the transmission timing difference, Δ, for at least one pair of cells comprising the first cell on the first carrier and the second cell on the second carrier.

In some embodiments, the first carrier and the second carrier are carriers configured for the UE for inter-band Carrier Aggregation (CA).

Embodiments of a UE for a cellular communications network are also disclosed. In some embodiments, the UE is adapted to determine a transmission timing difference, Δ, between a first cell that operates on a first carrier and a second cell that operates on a second carrier, wherein CCA is required to be performed on at least one of a first channel in which the first carrier is located and a second channel in which the second carrier is located before the UE is permitted to transmit. The UE is further adapted to use the transmission timing difference, Δ, for one or more operational tasks of the UE. The transmission timing difference, Δ, being determined when the first channel and the second channel are available at the UE for transmission of signals on the first cell and the second cell, respectively.

In some embodiments, the UE is further adapted to perform the method of operation of the UE according to any of the embodiments described herein.

In some embodiments, a UE for a cellular communications network comprises one or more processors and memory storing instructions executable by the one or more processors whereby the UE is operable to: (a) determine a transmission timing difference, Δ, between a first cell that operates on a first carrier and a second cell that operates on a second carrier, wherein CCA is required to be performed on at least one of a first channel in which the first carrier is located and a second channel in which the second carrier is located before the UE is permitted to transmit and (b) use the transmission timing difference, Δ, for one or more operational tasks of the UE. The transmission timing difference, Δ, being determined when the first channel and the second channel are available at the UE for transmission of signals on the first cell and the second cell, respectively.

In some embodiments, a UE for a cellular communications network comprises a determining module and a using module. The determining module is operable to determine a transmission timing difference, Δ, between a first cell that operates on a first carrier and a second cell that operates on a second carrier, wherein CCA is required to be performed on at least one of a first channel in which the first carrier is located and a second channel in which the second carrier is located before the UE is permitted to transmit. The using module is operable to use the transmission timing difference, Δ, for one or more operational tasks of the UE. The transmission timing difference, Δ, is determined when the first channel and the second channel are available at the UE for transmission of signals on the first cell and the second cell, respectively.

Embodiments of a method of operation of a node in a cellular communications network are also disclosed. In some embodiments, the method of operation of the node comprises obtaining one or more requirements or one or more conditions related to a transmission timing difference, Δ, for a pair of cells/carriers when a first channel and a second channel are available at a UE for transmission of uplink signals on a first cell and a second cell, respectively. The method further comprises controlling one or more factors that impact the transmission timing difference, Δ, or an applicability of the one or more requirements or the one or more conditions when at least one of the pair of cells/carriers is subject to uplink CCA to avoid or reduce a risk of the transmission timing difference, Δ, exceeding a predefined threshold.

In some embodiments, controlling the one or more factors that impact the transmission timing difference, Δ, or the applicability of the one or more requirements or the one or more conditions comprises one or more of: adapting scheduling of uplink transmissions, adapting scheduling of uplink transmissions to avoid scheduling of simultaneous transmissions on a first carrier of the first cell and a second carrier of the second cell, adapting scheduling of downlink transmissions to control times of related uplink transmissions, adapting at least one parameter related to uplink CCA configuration, controlling applicability, and changing one or more factors so that a requirement for applicability of at least one of the one or more requirements is made non-applicable.

In some embodiments, a node for a cellular communications network is adapted to obtain one or more requirements or one or more conditions related to a transmission timing difference, Δ, for a pair of cells/carriers when a first channel and a second channel are available for transmission of uplink signals on a first cell and a second cell, respectively. The node is further adapted to control one or more factors that impact the transmission timing difference, Δ, or an applicability of the one or more requirements or the one or more conditions when at least one of the pair of cells/carriers is subject to uplink CCA to avoid or reduce a risk of the transmission timing difference exceeding a predefined threshold.

In some embodiments, the node is further adapted to perform the method of operation of a node according to any of the embodiments described herein.

In some embodiments, a node for a cellular communications network comprises one or more processors and memory storing instructions executable by the one or more processors whereby the node is operable to: (a) obtain one or more requirements or one or more conditions related to a transmission timing difference, Δ, for a pair of cells/carriers when a first channel and a second channel are available for transmission of uplink signals on a first cell and a second cell, respectively, and (b) control one or more factors that impact the transmission timing difference, Δ, or an applicability of the one or more requirements or the one or more conditions when at least one of the pair of cells/carriers is subject to uplink CCA to avoid or reduce a risk of the transmission timing difference, Δ, exceeding a predefined threshold.

In some embodiments, a node for a cellular communications network comprises an obtaining module and a control module. The obtaining module is operable to obtain one or more requirements or one or more conditions related to a transmission timing difference, Δ, for a pair of cells/carriers when a first channel and a second channel are available for transmission of uplink signals on a first cell and a second cell. The control module is operable to control one or more factors that impact the transmission timing difference, Δ, or an applicability of the one or more requirements or the one or more conditions when at least one of the pair of cells/carriers is subject to uplink CCA to avoid or reduce a risk of the transmission timing difference, Δ, exceeding a predefined threshold.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
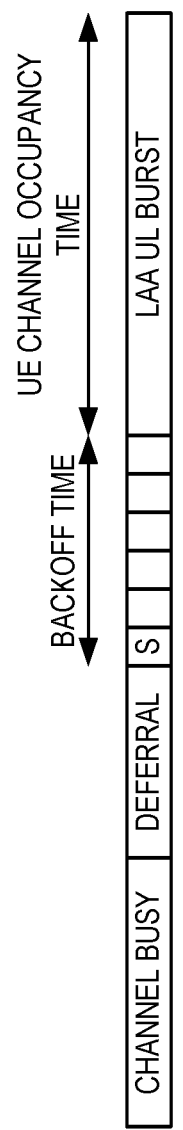
FIG. 1 illustrates an example sequence of different stages related to a Listen-Before-Talk (LBT) procedure, where "s" is the sensing time period.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Generalizations

Any two or more embodiments described in this document may be combined in any way with each other. Furthermore, even though the examples herein are given in the License Assisted Access (LAA) context, the embodiments described herein are not limited to LAA. The described embodiments are not limited to Long Term Evolution (LTE) either, but can be adapted in other Radio Access Technologies (RATs), e.g., Universal Terrestrial Radio Access (UTRA), LTE-Advanced, Fifth Generation (5G), Next Generation 5G RAT (NX), NarrowBand Internet of Things (NB-IoT), WiFi, Bluetooth, etc.

In some embodiments, a non-limiting term "User Equipment device (UE)" is used. The UE herein can be any type of wireless device capable of communicating with a network node or another UE over radio signals. The UE may also be a radio communication device, a target device, a Device-to-Device (D2D) UE, a machine type UE or a UE capable of Machine-to-Machine (M2M) communication, a sensor equipped with a UE, an iPAD, a tablet, mobile terminals, a smart phone, Laptop Embedded Equipment (LEE), Laptop Mounted Equipment (LME), Universal Serial Bus (USB) dongles, Customer Premises Equipment (CPE), etc.

Also in some embodiments the generic terminology "network node" is used. It can be any kind of network node which may comprise a radio network node such as a base station, a radio base station, a base transceiver station, a base station controller, a network controller, an enhanced or evolved Node B (eNB), a Node B, a Multi-cell/Multicast Coordination Entity (MCE), a relay node, an access point, a radio access point, a Remote Radio Unit (RRU) Remote Radio Head (RRH), a core network node (e.g., a Mobility Management Entity (MME), a Self-Organizing Network (SON) node, a coordinating node, a positioning node, a Minimization of Drive Tests (MDT) node, etc.), or even an external node (e.g., a third party node or a node external to the current network), etc.

In some embodiments the generic terminology Primary Cell (PCell), Primary Secondary Cell (PSCell) and Secondary (Serving) Cell (SCell) is used. These terms may refer to different types of serving cells which a certain UE is configured to use. Other terms which may be used for these terms are Primary Component Carrier (PCC), Primary Secondary Component Carrier (PSCC), and Secondary Component Carrier (SCC), respectively.

The term "radio node" used herein may be used to denote a UE or a radio network node.

The embodiments are applicable to single carrier as well as to multicarrier or Carrier Aggregation (CA) operation of the UE in which the UE is able to receive and/or transmit data to more than one serving cells. The term CA is also called (e.g., interchangeably called) "multi-carrier system," "multi-cell operation," "multi-carrier operation," and "multi-carrier" transmission and/or reception. In CA, one of the Component Carriers (CCs) is the PCC or simply primary carrier or even anchor carrier. The remaining ones are called SCCs or simply secondary carriers or even supplementary carriers. The serving cell is interchangeably called a PCell or Primary Serving Cell (PSC). Similarly, the secondary serving cell is interchangeably called a SCell or a Secondary Serving Cell (SSC).

In Dual Connectivity (DC) operation, the UE can be served by at least two nodes called Master eNB (MeNB) and Secondary eNB (SeNB). More generally, in multiple connectivity (aka multi-connectivity) operation the UE can be served by two or more nodes, e.g. MeNB, SeNB1, SeNB2, and so on. The UE is configured with PCC from both the MeNB and the SeNB. The PCells from the MeNB and the SeNB are called PCell and PSCell, respectively. The PCell and the PSCell operate the UE typically independently. The UE is also configured with one or more SCCs from each of the MeNB and the SeNB. The corresponding SSCs served by the MeNB and the SeNB are called SCells. The UE in DC typically has separate Transmitters/Receivers (TX/RX) for each of the connections with the MeNB and the SeNB. This allows the MeNB and the SeNB to independently configure the UE with one or more procedures, e.g. Radio Link Monitoring (RLM), Discontinuous Reception (DRX) cycle, etc., on their PCell and PSCell, respectively. The methods and embodiments are applicable to CA, DC, and Multi-Connectivity (MC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term Discovery Reference Symbol (DRS) or discover (or discovery) signal may comprise any type of reference signal, which can be used by the UE for performing one or more measurements. Examples of DRS are Common Reference Symbol (CRS), Channel State Information Reference Symbol (CSI-RS), Primary Synchronization Signal (PSS), Secondary Synchronization Signal (SSS), Multicast-Broadcast Single Frequency Network Reference Symbol (MBSFN RS), etc. One or more DRS may be transmitted in the same DRS time resource. Examples of DRS time resources are symbol, subframe, slot, etc.

The term Listen-Before-Talk (LBT) used herein may correspond to any type of Carrier Sense Multiple Access (CSMA) procedure or mechanism which is performed by the node on a carrier before deciding to transmit signals on that carrier. CSMA or LBT may also interchangeably called Clear Channel Assessment (CCA), clear channel determination, etc. The transmission of signals on carrier subjected to LBT is also called contention based transmission. On the other hand the transmission of signals on a carrier which is not subjected to LBT is also called contention free transmission.

The term time resource used herein may correspond to any type of physical resource or radio resource expressed in terms of length of time. Examples of time resources are: symbol, time slot, subframe, radio frame, Transmit Time Interval (TTI), interleaving time, etc.

The term transmission timing difference used herein may correspond to the difference between uplink transmit timing of any two group of cells, aka set of cells. Each group may contain one or more cells. Each group is assumed to have one common uplink transmit timing, which can be the timing of a specific cell within the group or it can be a function of transmit timings of two or more cells. Examples of function are minimum, maximum, average, xth percentile, etc. The timing of the group is typically based on the uplink timing adjustment done by the UE. The UE may adjust the timing based on one or more of the following principles: Timing Advance (TA) command received from the network node, TA command received from another UE, autonomous adjustment by the UE based on downlink cell timing, autonomous adjustment by the UE based on downlink timing of another UE, autonomous adjustment by the UE based on the timing of one or more external timing reference sources, etc. Examples of external reference source are navigational satellite such as Global Navigation Satellite System (GNSS) (e.g., Global Positioning System (GPS)), beacon, etc. Examples of group of cells with a common transmit timing are TA Group (TAG), e.g. Primary TAG (pTAG), Secondary TAG (sTAG), Primary Secondary TAG (psTAG), etc. The transmission timing difference is also interchangeably called a time difference between TAGs, e.g. between two sTAGs, or between pTAG and sTAG.

Problems with Existing Solutions

At least the following problems may be envisioned with existing solutions. For a UE performing uplink LBT, the transmission timing difference currently may still be calculated even when the uplink transmission is not actually transmitted due to uplink LBT failure (i.e., the UE was not able to access the channel after the LBT), even though there is no Radio Frequency (RF) issue in this case. Furthermore, calculating the transmission timing difference when the uplink transmission is not actually transmitted due to uplink LBT may also lead to the UE stopping a transmission in another cell (i.e., it will not transmit in this case in one cell due to uplink LBT and it will also not transmit in the other cell due to inappropriate calculation of the transmission timing difference). It is resource consuming for the UE to estimate the transmission timing difference when it is not needed.

Brief Summary of the Proposed Solutions

At least the following embodiments are described in this document.

Methods in a UE, comprising the steps of (see FIG. 2):

Step 100 (optional): Obtaining at least one requirement and/or condition for the transmission timing difference, Δ, for a pair of cells comprising cell 1 on carrier frequency f1 and cell 2 on carrier frequency f2, where CCA (e.g., LBT) may need to be performed on at least one of f1 and f2

Step 102 (optional): Determining the need for determining the transmission timing difference, Δ, for at least one pair of cells comprising cell 1 on carrier frequency f1 and cell 2 on carrier frequency f2, where CCA (e.g., LBT) may need to be performed on at least one of f1 and f2

Step 104: Determine the transmission timing difference, Δ, when a first channel and a second channel are available for transmission of uplink signals on cell 1 and cell 2, respectively Step 106: Using the determined transmission timing difference, Δ, for one or more UE operational tasks, while accounting for CCA (e.g., LBT)

Methods in a network node, comprising the steps of (see FIG. 3):

Step 200: Obtaining requirement(s) or condition(s) related to transmission timing difference, Δ, for a pair of cells/carriers when a first channel and a second channel are available for transmission of uplink signals on cell 1 and cell 2, respectively Step 202: Controlling one or more factors impacting the transmission timing difference, Δ, or the applicability of the obtained requirement(s) when at least one of the cells/carriers is subject to uplink CCA (e.g., uplink LBT) to avoid or reduce the risk of the transmission timing difference, Δ, exceeding a threshold

Advantages of the Proposed Solution

At least the following advantages can be envisioned with the described embodiments. The unnecessary transmission loss due to inappropriate calculation of the transmission timing difference, Δ, when the UE performs LBT. The UE processing and complexity are reduced since the UE does not have to estimate transmission timing difference, Δ, between cells when there is LBT failure on at least one of the cells. The UE power consumption is reduced since the UE does not have to estimate transmission timing difference, Δ, between cells when there is LBT failure on at least one of the cells.

Methods in a UE

Figure 2:
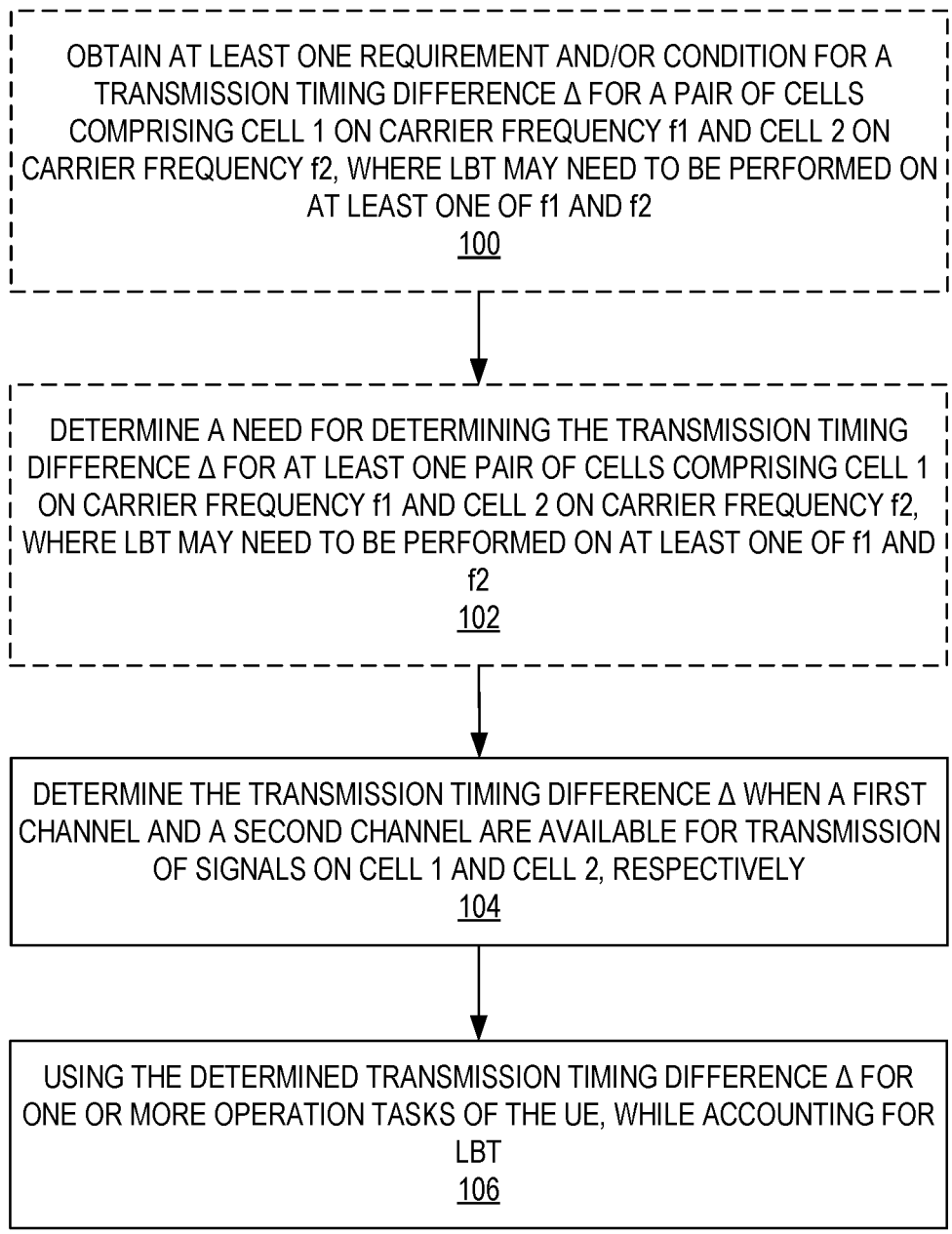
FIG. 2 is a flow chart that illustrates a method of operation of a User Equipment device (UE) according to some embodiments of the present disclosure.

As illustrated in FIG. 2, methods in a UE comprise the steps of:

Step 100 (optional): Obtaining at least one requirement and/or condition for the transmission timing difference, Δ, for a pair of cells comprising cell 1 on carrier frequency f1 and cell 2 on carrier frequency f2, where CCA (e.g., LBT) may need to be performed on at least one of f1 and f2

Step 102 (optional): Determining the need for determining the transmission timing difference, Δ, for at least one pair of cells comprising cell 1 on carrier frequency f1 and cell 2 on carrier frequency f2, where CCA (e.g., LBT) may need to be performed on at least one of f1 and f2

Step 104: Determining the transmission timing difference, Δ, when a first channel and a second channel are available for transmission of signals on cell1 and cell2, respectively Step 106: Using the determined transmission timing difference, Δ, for one or more UE operational tasks, while accounting for CCA (e.g., LBT)

Step 100

An example requirement is the maximum transmission timing difference, Δ, or a threshold related to transmission timing difference, Δ. Example conditions: e.g., a carrier type (e.g., unlicensed), a type of carrier combination of the two carriers (e.g., intra- or inter-band), UE capability related to the transmission timing difference, Δ, availability of the channel for the transmission in cell 1 and/or cell 2, channel occupancy time (e.g., different requirements may apply depending on the UE's channel occupancy), etc.

The requirement or condition may be obtained, e.g., by one or more of:

Determining based on a predefined rule,
Determining based on UE capability,
Determining based on UE CA configuration,
Determining based on whether the UE is in dual (or multi) connectivity or not,
Determining based on UE's preference,
Determining based on UE's performance target,
Using predefined requirement(s) or condition(s),
Selecting requirement(s) or condition(s) from a set of requirements or conditions, e.g., based on a rule,
Receiving from another node, and
Deriving from reference requirement(s) or condition(s), e.g., by applying an offset to a predefined requirement or condition.

Step 102

In this step, the UE may determine the need for determining the transmission timing difference, Δ, for at least one pair of cells comprising cell 1 on carrier frequency f1 and cell 2 on carrier frequency f2, where CCA (e.g., LBT) may need to be performed on at least one of f1 and f2. As will be understood by one of skill in the art upon reading this disclosure, CCA is required to be performed on f1 and/or f2, depending on the particular implementation. This requirement may be made by a regulatory agency or body, standard, and/or the like. However, it is up to the UE to satisfy this requirement. In other words, the UE may not be limited from a hardware perspective, but may be programmed or otherwise designed or operated to satisfy the requirement. The cell 1 and cell 2 may belong to different groups where each group is associated with separate but one common uplink transmission timing for each group. For example, cell 1 and cell 2 may belong to different TAGs, e.g. sTAG1 and sTAG2, etc.

The requirement or condition obtained in step 100 may also be used in step 102.

The UE may determine that, e.g., one or more of:

It is not needed if the transmission is definitely not possible due to uplink LBT failure (i.e., the uplink LBT result is known), It is not needed if the transmission is definitely not possible due to backoff until the UE can transmit or deferral time after the uplink LBT failure, It is not needed during the sensing time if the UE cannot transmit and sense on the same carrier, It is not needed if the transmission may be not possible due to uplink LBT failure (i.e., when the LBT result is uncertain), It is not needed if the transmission is likely not possible due to uplink LBT failure (e.g., a prediction based on statistics; or estimating a probability of LBT failure is above a threshold and/or LBT success is below a threshold, based on channel occupancy measurements or similar), It is needed if the transmission is definitely possible after uplink LBT (i.e., the uplink LBT result is known, e.g., in the same subframe the uplink LBT is successful or during the entire channel holding time), It is needed if a first requirement or condition was obtained in step 100, and it is not needed if a second requirement or condition was obtained in step 100, It may be needed if the transmission may be possible after uplink LBT (i.e., the uplink LBT result is uncertain), It is needed if the transmission is likely to be possible after an uplink LBT failure (i.e., the uplink LBT result is uncertain but uplink LBT success is likely, e.g., with a prediction based on statistics; or estimating a probability of LBT success is above a threshold and/or LBT failure is below a threshold, based on channel occupancy measurements or similar), A maximum transmission timing difference, Δ, requirement is not applicable in certain subframes in relation to uplink LBT, hence there is no need to determine the transmission timing difference, A (e.g., the requirement does not apply for a pair of cells or carriers when at least in one of them the UE is unable to transmit, even a scheduled transmission, due to channel unavailability, e.g. when uplink LBT failed or during the deferral or back of time until the time when the UE is allowed to transmit), It is not needed if the transmission timing difference, Δ, on the cells of two different groups has been estimated by the UE within the last X number of time resources, otherwise it is needed to be estimated, It is needed if the transmission time on at least one of the cells of two different groups has been changed by certain margin since the last estimation of the transmission timing difference, Δ, e.g. by more than Y1 nanosecond (ns) or X1 microsecond (μs), etc., It is needed if the downlink received timing of any of the two cells of two different groups has been changed by certain margin since the last estimation of the transmission timing difference, Δ, e.g. by more than Y2 ns or X2 μs etc., and It is needed if the UE has received a new TA command for adjusting the transmission timing of signals in cells of any of the two different groups.

Step 104

In this step, the UE determines the transmission timing difference, Δ.

The result of step 100 may also be used in step 104.

Determining the transmission timing difference, Δ, may also be subject to one or more or more conditions, e.g.:

Determine the transmission timing difference, Δ, upon determining the need for it (see step 102), Determine the transmission timing difference, Δ, after the uplink LBT result is known and the result is that the UE gets the access to the channel, i.e. uplink LBT has been successful, Do not determine the transmission timing difference, Δ, after the uplink LBT result is known and the result is negative, Do not determine the transmission timing difference, Δ, during the deferral time or during the backoff time (since the channel is either not available or the UE cannot transmit), Do not determine the transmission timing difference, Δ, before the uplink LBT result is known, Determine the transmission timing difference, Δ, during channel occupancy time of the pair of cells, i.e. the time period during which the UE has an access to the channels for transmission of uplink signals in both cell 1 and cell 2, Determine the transmission timing difference, Δ, during channel occupancy time of the pair of cells and also when the UE actually transmits the uplink signals in cell 1 and cell 2, Determine the transmission timing difference, Δ, during channel occupancy time of the pair of cells, when the UE has received a new TA command for adjusting the transmission timing of signals in cells of any of the two different cell groups and also when the UE actually transmits the uplink signals in cell 1 and cell 2, and For a pair of cells/carriers where at least one of them in unlicensed carrier and requires LBT, the UE may also adapt the times at which the transmission timing difference, Δ, is determined to the subframes with a known positive result of uplink LBT (e.g., during the channel holding time). If only one cell/carrier is subject to LBT, the adaptation is done with respect to that cell. If both cells/carriers are subject to LBT, the adaptation is done so that the transmission timing difference, Δ, is determined during the times with a known positive result of uplink LBT for both cells/carriers (e.g., during the overlapping channel holding times). The adaptation may also depend on the results of step 100, e.g., performed differently depending on whether a first requirement was obtained or a second requirement was obtained.

Step 106

In this step, the UE may use the determined transmission timing difference, Δ, for one or more UE's operational tasks, e.g., one or more of:

Compare the determined transmission timing difference, Δ, to the obtained in step 100 requirement and/or condition, If Δ> threshold, the UE may stop a transmission in cell 1 and/or stop updating the timing for cell 1, e.g., when one or more of the below apply:

The maximum transmission timing difference, Δ, requirement is applicable and the applicability is related to LBT, At least cell 1 is in the unlicensed band and may require LBT, and A scheduled cell 2 transmission is not seized due to uplink LBT, If Δ> threshold, the UE may stop a transmission in cell 1 and/or stop updating the timing for cell 1 but not in cell 2 when cell 1 is subject to LBT and cell 2 is not, If the transmission timing difference, Δ, is determined before uplink LBT, the UE may drop or disregard Δ, If Δ> threshold, then the UE may stop timeAlignmentTimer (TAT) associated with TAG in which cell 1 is configured or belongs to. The stopping of TAT may be realized by resetting the timer or initializing the timer. In this case the Medium Access Control (MAC) entity in the UE may not perform any uplink transmission on cell 1 except the random access preamble transmission when the TAT associated with the TAG to which this serving cell (i.e., cell 1) belongs is not running, If Δ> threshold, then the UE may also inform the network node that the UE has performed any one or more of the above tasks, e.g. stopped transmission in cell 1, stopped updating the timing for cell 1, stopped TAT for TAG containing cell 1, etc., and If Δ> threshold, then the UE may reconfigure the timing relation between cell 1 and cell 2, e.g., constitute new subframe pairs for cell 1 and cell 2.

Methods in a Network Node

Figure 3:
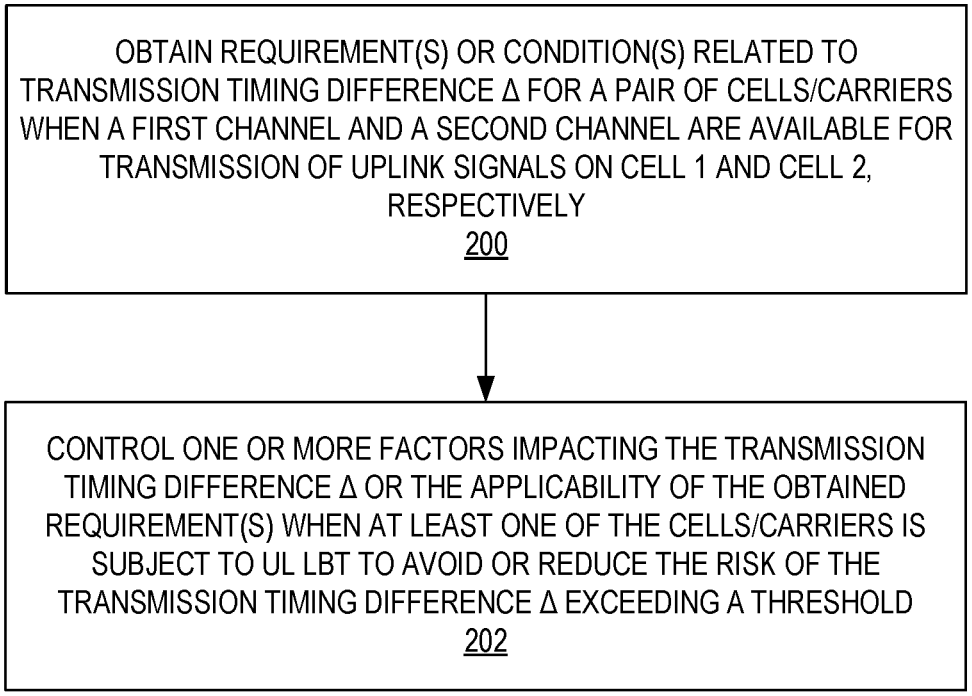
FIG. 3 is a flow chart that illustrates a method of operation of a network node according to some embodiments of the present disclosure.

As illustrated in FIG. 3, methods in a network node comprise the steps of:

Step 200: Obtaining requirement(s) or condition(s) related to transmission timing difference, Δ, for a pair of cells/carriers when a first channel and a second channel are available for transmission of uplink signals on cell 1 and cell 2, respectively Step 202: Controlling one or more factors impacting the transmission timing difference, Δ, or the applicability of the obtained requirement(s) when at least one of the cells/carriers is subject to uplink CCA (e.g., uplink LBT), to avoid or reduce the risk of the transmission timing difference, Δ, exceeding a threshold Step 200

There may be different requirements, e.g., for intra-band and inter-band or with and without DC.

See more example requirements and conditions in step 100 of the UE embodiments above.

The requirement or condition may be obtained, e.g., by one or more of:

Determining based on a predefined rule,
Determining based on UE capability,
Determining based on UE's preference (e.g., indicated by the UE),
Determining based on UE's performance target,
Using predefined requirement(s) or condition(s),
Selecting requirement(s) or condition(s) from a set of requirements or conditions, e.g., based on a rule,
Receiving from another node, and
Deriving from reference requirement(s) or condition(s), e.g., by applying an offset to a predefined requirement or condition.

Step 202

The controlling may then comprise, e.g., one or more of:

Adapting the scheduling for uplink transmissions, e.g., avoid scheduling of simultaneous transmissions on f1 and f2, Adapting the scheduling of downlink transmissions to control the times of related uplink transmissions (e.g., Acknowledgements/Negative Acknowledgements (ACKs/NACKs) transmitted on Physical Uplink Control Channel (PUCCH)), Adapting at least one parameter related to uplink LBT configuration (if the network has some control over UE LBT), and Controlling applicability which may further comprise changing one or more factors so that the requirement which is difficult to fulfill is made non-applicable (e.g., the maximum transmission timing difference, Δ, may apply when the channel is available as a result of LBT and the actual transmissions occur at the same time, so misaligning the transmissions in time may make the requirement non-applicable and transmitting at different times with a larger transmission timing difference, Δ, may be not a problem).

The controlling may also be triggered when the transmission timing difference, Δ, approaches the maximum transmission timing difference, Δ, or is above a threshold, e.g., to ensure the transmission timing difference, Δ, does not go beyond the threshold.

Example System and Node Architectures

Figure 4:
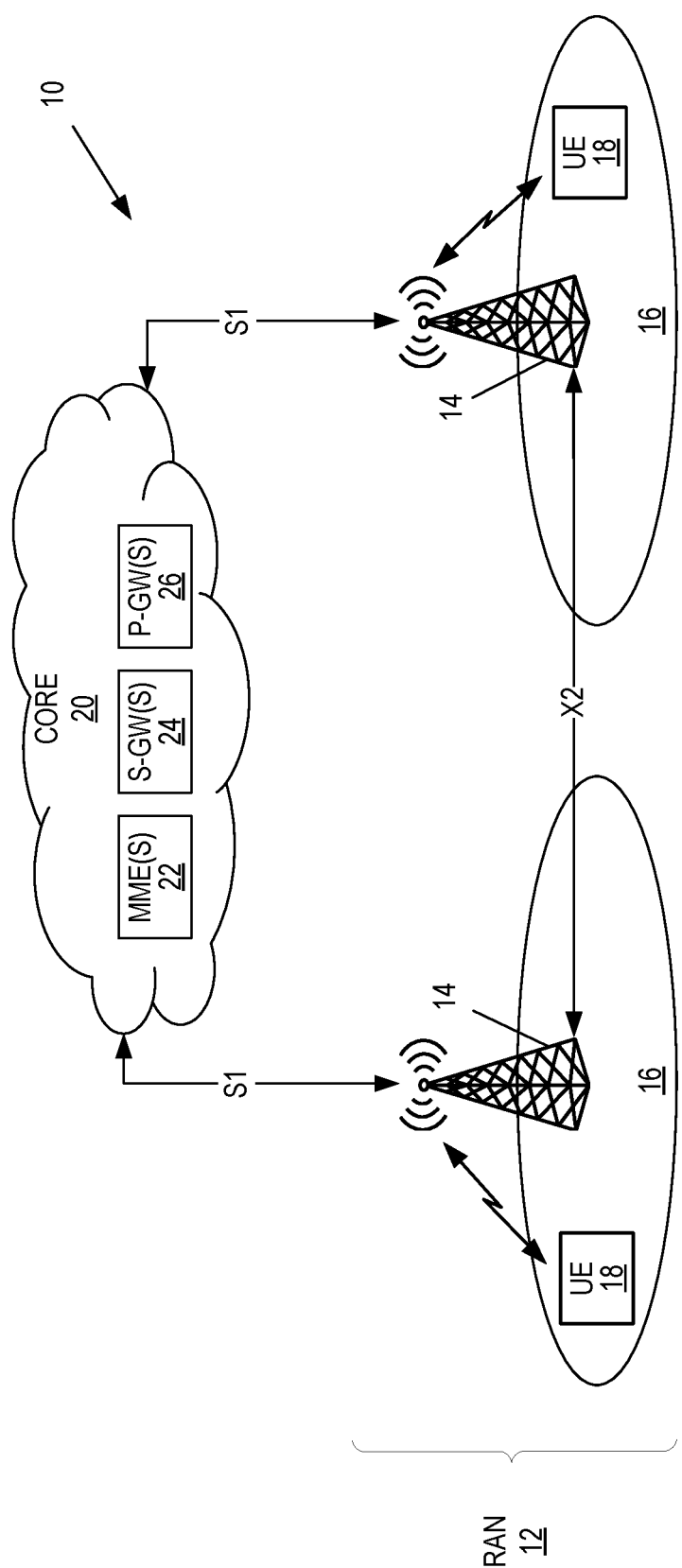
FIG. 4 illustrates one example of a cellular communications network in which embodiments of the present disclosure can be implemented.

FIG. 4 illustrates one example of a cellular communications network 10 in which embodiments of the present disclosure can be implemented. Note, however, that FIG. 4 is only an example. As illustrated, the cellular communications network 10 includes a Radio Access Network (RAN) 12, which includes a number of radio access nodes including, in this example, a number of base stations 14 (e.g., eNBs) serving corresponding cells 16. UEs 18 located in the cells 16 transmit and receive wireless signals to/from the base stations 14. The base stations 14 are connected to a core network 20, which includes a number of core network nodes. The core network nodes may include, for example, one or more MMEs 22, one or more Serving Gateways (S-GWs) 24, and one or more Packet Data Network (PDN) Gateways (P-GWs) 26.

While only two cells 16 are illustrated in the example of FIG. 4, the cellular communications network 10 may include many cells 16. Further, as discussed herein, a particular UE 18 may operate on multiple cells, at least some of which may require LBT (e.g., are in an unlicensed spectrum).

Figure 5:
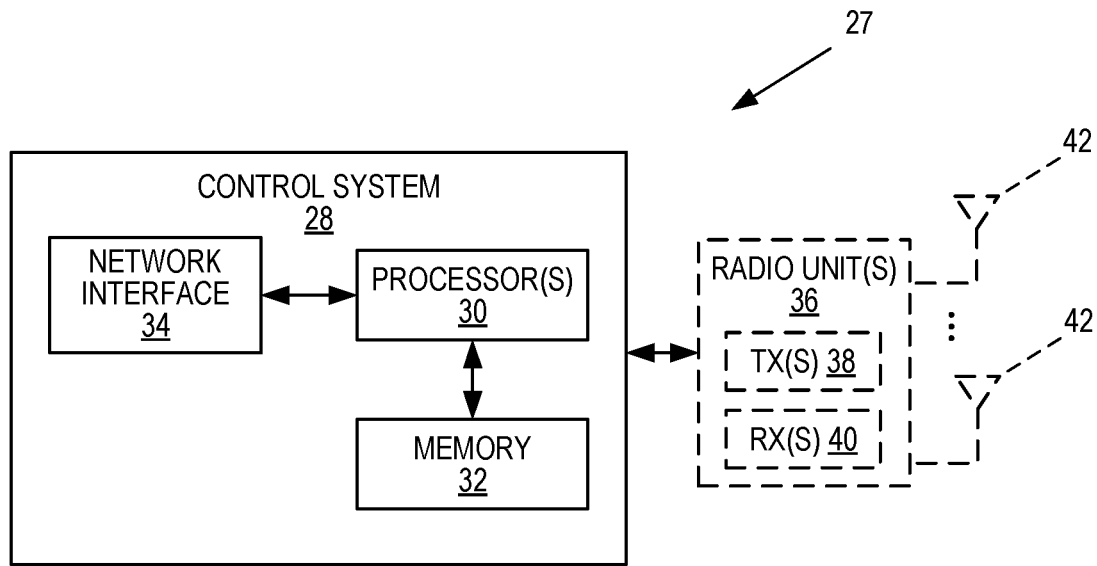
FIGS. 5 to 7 are block diagrams of example embodiments of a network node.

FIG. 5 is a schematic block diagram of a network node 27 according to some embodiments of the present disclosure. The network node 27 may be, for example, a radio access node such as, for example, a base station 14 of FIG. 4 or a core network node such as, for example, a node in the core network 20 of FIG. 4. As illustrated, the network node 27 includes a control system 28 that includes one or more processors 30 (e.g., Central Processing Units (CPUs), Application Specific Integrated Circuits (ASICs), Field Programmable Gate Arrays (FPGAs), and/or the like), memory 32, and a network interface 34. In addition, if the network node 27 is a radio access node, then the network node 27 also includes one or more radio units 36 that each includes one or more transmitters 38 and one or more receivers 40 coupled to one or more antennas 42. In some embodiments, the radio unit(s) 36 is external to the control system 28 and connected to the control system 28 via, e.g., a wired connection (e.g., an optical cable). However, in some other embodiments, the radio unit(s) 36 and potentially the antenna(s) 42 are integrated together with the control system 28. The one or more processors 30 operate to provide one or more functions of a network node as described herein. In some embodiments, the function(s) are implemented in software that is stored, e.g., in the memory 32 and executed by the one or more processors 30.

Figure 6:
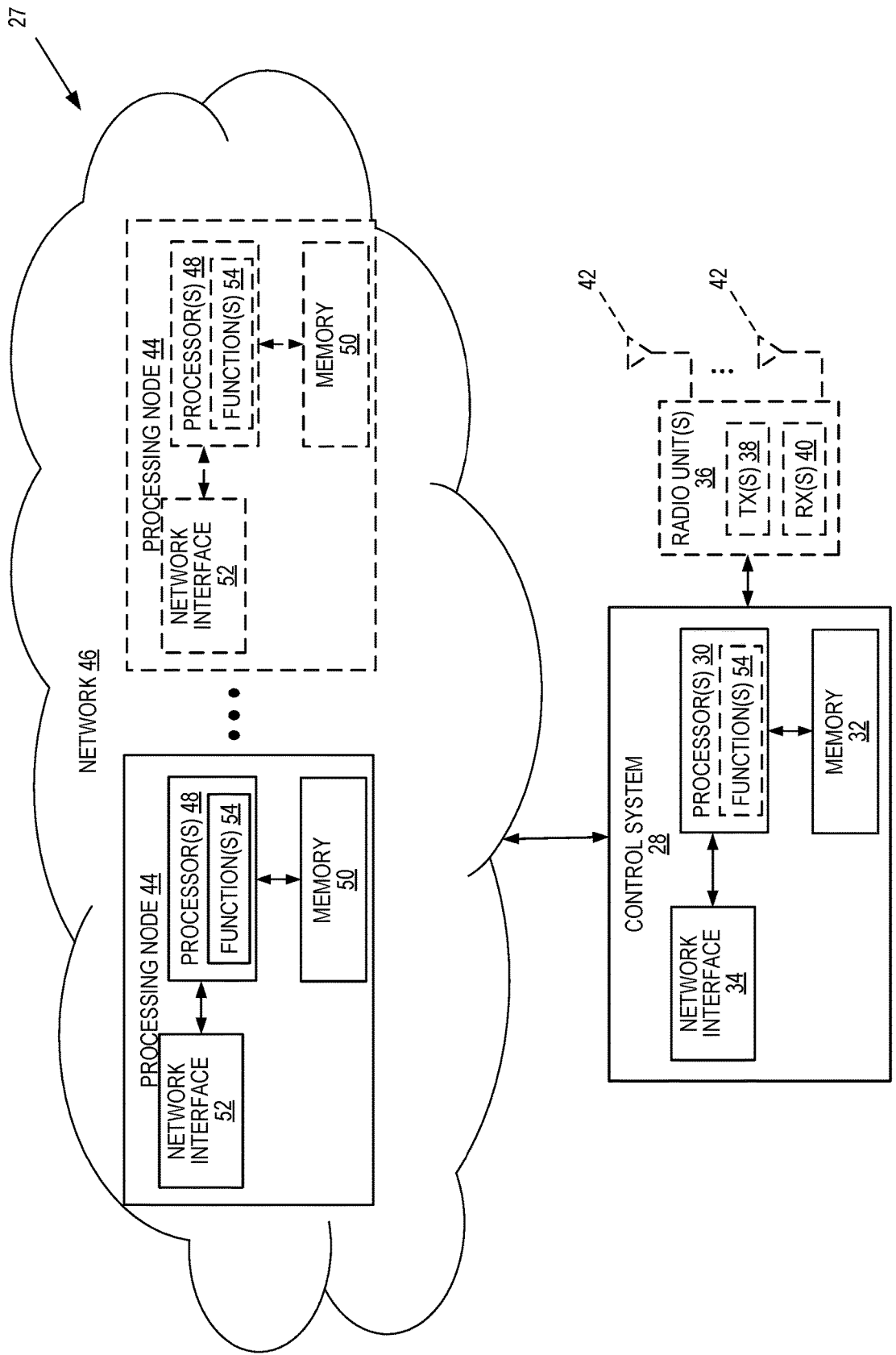

FIG. 6 is a schematic block diagram that illustrates a virtualized embodiment of the network node 27 according to some embodiments of the present disclosure. This discussion is equally applicable to other types of radio access nodes. Further, other types of network nodes may have similar virtualized architectures.

As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). As illustrated, in this example, the network node 27 includes the control system 28 that includes the one or more processors 30 (e.g., CPUs, ASICs, FPGAs, and/or the like), the memory 32, and the network interface 34 and, depending on the type of network node, the one or more radio units 36 that each includes the one or more transmitters 38 and the one or more receivers 40 coupled to the one or more antennas 42, as described above. The control system 28 is connected to the radio unit(s) 36 via, for example, an optical cable or the like. The control system 28 is connected to one or more processing nodes 44 coupled to or included as part of a network(s) 46 via the network interface 34. Each processing node 44 includes one or more processors 48 (e.g., CPUs, ASICs, FPGAs, and/or the like), memory 50, and a network interface 52.

In this example, functions 54 of the network node (e.g., functions of the network node described above with respect to FIG. 3) described herein are implemented at the one or more processing nodes 44 or distributed across the control system 28 and the one or more processing nodes 44 in any desired manner. In some particular embodiments, some or all of the functions 54 of the network node 26 described herein are implemented as virtual components executed by one or more virtual machines implemented in a virtual environment(s) hosted by the processing node(s) 44. As will be appreciated by one of ordinary skill in the art, additional signaling or communication between the processing node(s) 44 and the control system 28 is used in order to carry out at least some of the desired functions 54. Notably, in some embodiments, the control system 28 may not be included, in which case the radio unit(s) 36 communicate directly with the processing node(s) 44 via an appropriate network interface(s). Further, in embodiments in which the network node 27 is not a radio access node (e.g., a core network node), then the network node 27 may be entirely virtualized (i.e., there may be not control system 28 or radio unit(s) 36).

In some embodiments, a computer program including instructions which, when executed by at least one processor, causes the at least one processor to carry out the functionality of a network node or a node (e.g., a processing node 44) implementing one or more of the functions 54 of the network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
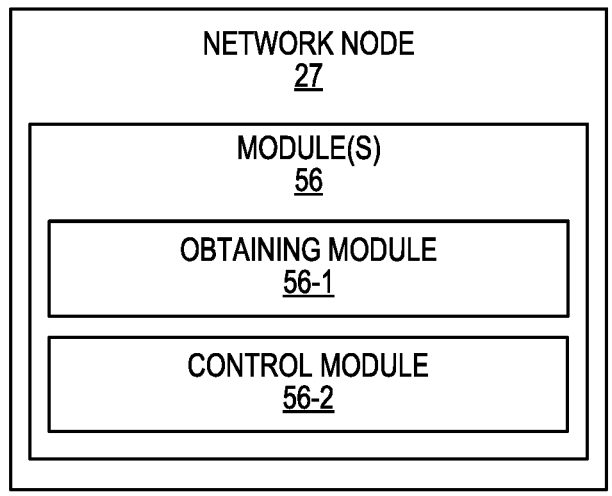

FIG. 7 is a schematic block diagram of the network node 27 according to some other embodiments of the present disclosure. The network node 27 includes one or more modules 56, each of which is implemented in software. The module(s) 56 provide the functionality of the network node 27 described herein. For example, the module(s) 56 may include one or modules that perform the operations of the network node 27 described with respect to FIG. 3 above (e.g., an obtaining module 56-1 that performs step 200 and a control module 56-2 that performs step 202).

Figure 8:
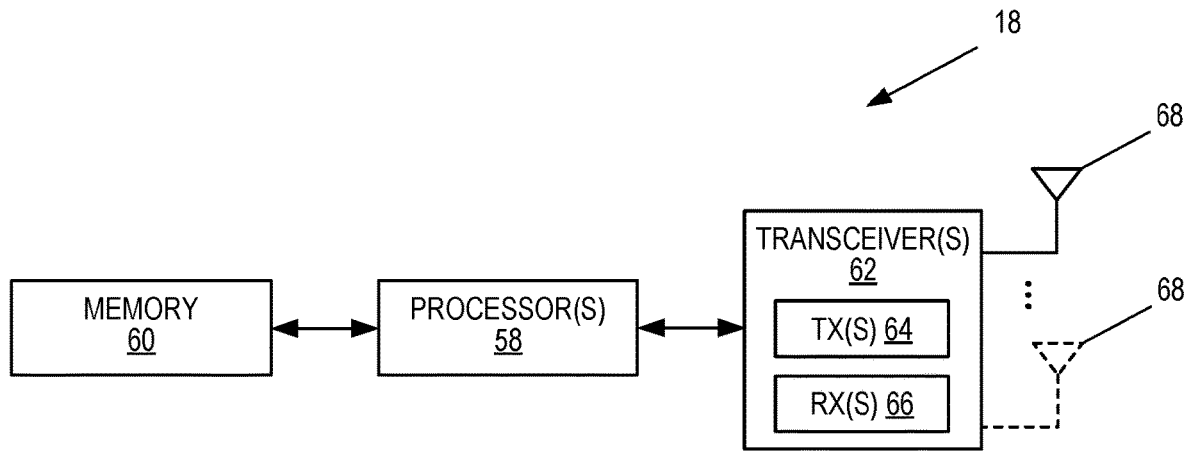
FIGS. 8 and 9 are block diagrams of example embodiments of a UE.

FIG. 8 is a schematic block diagram of the UE 18 according to some embodiments of the present disclosure. As illustrated, the UE 18 includes one or more processors 58 (e.g., CPUs, ASICs, FPGAs, and/or the like), memory 60, and one or more transceivers 62 each including one or more transmitters 64 and one or more receivers 66 coupled to one or more antennas 68. In some embodiments, the functionality of the UE 18 described above (e.g., with respect to FIG. 2) may be fully or partially implemented in software that is, e.g., stored in the memory 60 and executed by the processor(s) 58.

In some embodiments, a computer program including instructions which, when executed by at least one processor, causes the at least one processor to carry out the functionality of the UE 18 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
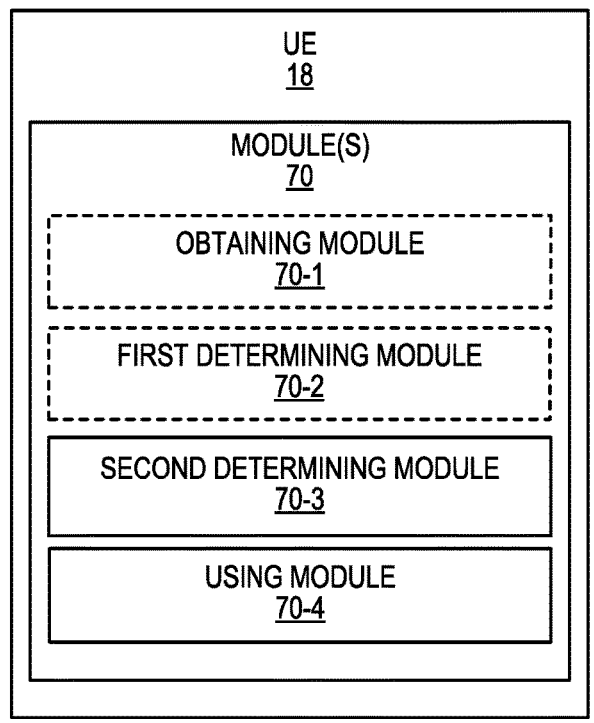

FIG. 9 is a schematic block diagram of the UE 18 according to some other embodiments of the present disclosure. The UE 18 includes one or more modules 70, each of which is implemented in software. As an example, in some embodiments, the one or more modules 70 include one or more modules that operate to perform the process described above with respect to FIG. 2. For example, the modules 70 may include an (optional) obtaining module 70-1 that operates to perform step 100 of FIG. 2, an (optional) first determining module 70-2 that operates to perform step 102 of FIG. 2, a second determining module 70-3 that operates to perform step 104 of FIG. 2, and a using module 70-4 that operates to perform step 106 of FIG. 2.

While not being limited thereto, some example embodiments of the present disclosure are provided below.

Embodiment 1: A method of operation of a User Equipment, UE, (18), comprising:
  determining (104) a transmission timing difference, $\Delta$, when a first channel and a second channel are available at the UE (18) for transmission of signals on a first cell and a second cell, respectively; and
  using (106) the transmission timing difference, $\Delta$, for one or more operation tasks of the UE (18).

Embodiment 2: The method of embodiment 1 wherein at least one of the first cell is on a first carrier, the second cell is on a second carrier, and Clear Channel Assessment, CCA, must be performed on at least one of the first carrier and the second carrier before the UE (18) is permitted to transmit.

Embodiment 3: The method of embodiment 2 further comprising determining (102) a need for determining the transmission timing difference, $\Delta$, for at least one pair of cells comprising the first cell on the first carrier frequency and the second cell on the second carrier frequency.

Embodiment 4: The method of embodiment 2 or 3 further comprising obtaining (100) at least one requirement and/or condition for the transmission timing difference, Δ, for a pair of cells comprising the first cell on the first carrier frequency and the second cell on the second carrier frequency.

Embodiment 5: The method of embodiment 4 wherein determining (104) the transmission timing difference, Δ, comprises determining (104) a transmission timing difference, Δ, when the first channel and the second channel are available for transmission of signals on the first cell and the second cell, respectively, based on the at least one requirement and/or condition for the transmission timing difference, Δ, for the pair of cells comprising the first cell on the first carrier frequency and the second cell on the second carrier frequency.

Embodiment 6: A User Equipment, UE, (18) for a cellular communications network (10), the UE (18) adapted to:
determine a transmission timing difference, Δ, when a first channel and a second channel are available for transmission of signals on a first cell and a second cell, respectively; and
use the transmission timing difference, Δ, for one or more operation tasks of the UE (18).

Embodiment 7: The UE (18) of embodiment 6 wherein the UE (18) is further adapted to perform the method of any of embodiments 2 to 5.

Embodiment 8: A User Equipment, UE, (18) for a cellular communications network (10), comprising:
one or more processors (58); and
memory (60) storing instructions executable by the one or more processors (58) whereby the UE (18) is operable to:
determine a transmission timing difference, Δ, when a first channel and a second channel are available for transmission of signals on a first cell and a second cell, respectively; and
use the transmission timing difference, Δ, for one or more operation tasks of the UE (18).

Embodiment 9: A User Equipment, UE, (18) for a cellular communications network (10), comprising:
a determining module (70-3) operable to determine a transmission timing difference, Δ, when a first channel and a second channel are available for transmission of signals on a first cell and a second cell, respectively; and
a using module (70-4) operable to use the transmission timing difference, Δ, for one or more operation tasks of the UE (18).

Embodiment 10: A method of operation of a node (14) in a cellular communications network (10), comprising:
obtaining (200) one or more requirements or one or more conditions related to a transmission timing difference, Δ, for a pair of cells/carriers when a first channel and a second channel are available at a User Equipment, UE, (18) for transmission of uplink signals on a first cell and a second cell, respectively; and
controlling (202) one or more factors that impact the transmission timing difference, Δ, or an applicability of the one or more requirements or the one or more conditions when at least one of the pair of cells/carriers is subject to uplink Clear Channel Assessment, CCA, to avoid or reduce a risk of the transmission timing difference, Δ, exceeding a predefined threshold.

Embodiment 11: The method of embodiment 10 wherein controlling (202) the one or more factors that impact the transmission timing difference, Δ, or the applicability of the one or more requirements or the one or more conditions comprises one or more of:
adapting scheduling of uplink transmissions;
adapting scheduling of uplink transmissions to avoid scheduling of simultaneous transmissions on a first carrier frequency of the first cell and a second carrier frequency of the second cell;
adapting scheduling of downlink transmissions to control times of related uplink transmissions;
adapting at least one parameter related to uplink CCA configuration;
controlling applicability; and
changing one or more factors so that a requirement for applicability of at least one of the one or more requirements is made non-applicable.

Embodiment 12: A node (14) for a cellular communications network (10), the node (14) adapted to:
obtain one or more requirements or one or more conditions related to a transmission timing difference, Δ, for a pair of cells/carriers when a first channel and a second channel are available for transmission of uplink signals on a first cell and a second cell, respectively; and
control one or more factors that impact the transmission timing difference, Δ, or an applicability of the one or more requirements or the one or more conditions when at least one of the pair of cells/carriers is subject to uplink Clear Channel Assessment, CCA, to avoid or reduce a risk of the transmission timing difference, Δ, exceeding a predefined threshold.

Embodiment 13: The node (14) of embodiment 12 wherein the node (14) is further adapted to perform the method of embodiment 11

Embodiment 14: A node (27) for a cellular communications network (10), the node (27) comprising:
one or more processors (30, 48); and
memory (32, 50) storing instructions executable by the one or more processors (30, 48) whereby the node (27) is operable to:
obtain one or more requirements or one or more conditions related to a transmission timing difference, Δ, for a pair of cells/carriers when a first channel and a second channel are available for transmission of uplink signals on a first cell and a second cell, respectively; and
control one or more factors that impact the transmission timing difference, Δ, or an applicability of the one or more requirements or the one or more conditions when at least one of the pair of cells/carriers is subject to uplink Clear Channel Assessment, CCA, to avoid or reduce a risk of the transmission timing difference, Δ, exceeding a predefined threshold.

Embodiment 15: A node (27) for a cellular communications network (10), comprising:
an obtaining module (56-1) operable to obtain one or more requirements or one or more conditions related to a transmission timing difference, Δ, for a pair of cells/carriers when a first channel and a second channel are available for transmission of uplink signals on a first cell and a second cell, respectively; and
a control module (56-2) operable to control one or more factors that impact the transmission timing difference, Δ, or an applicability of the one or more requirements or the one or more conditions when at least one of the pair of cells/carriers is subject to uplink Clear Channel Assessment, CCA, to avoid or reduce a risk of the transmission timing difference, Δ, exceeding a predefined threshold.

The following acronyms are used throughout this disclosure.

- µs Microsecond
- 3GPP Third Generation Partnership Project
- 5G Fifth Generation
- ACK Acknowledgement
- ASIC Application Specific Integrated Circuit
- CA Carrier Aggregation
- CC Component Carrier
- CCA Clear Channel Assessment
- CPE Customer Premises Equipment
- CPU Central Processing Unit
- CRS Common Reference Symbol
- CSI-RS Channel State Information Reference Symbol
- CSMA Carrier Sense Multiple Access
- D2D Device-to-Device
- DC Dual Connectivity
- DRS Discovery Reference Symbol
- DRX Discontinuous Reception
- eNB Enhanced or Evolved Node B
- FDD Frequency Division Duplex
- FPGA Field Programmable Gate Array
- FS3 Frame Structure Type 3
- GNSS Global Navigation Satellite System
- GPS Global Positioning System
- LAA License Assisted Access
- LBT Listen-Before-Talk
- LEE Laptop Embedded Equipment
- LME Laptop Mounted Equipment
- LTE Long Term Evolution
- M2M Machine-to-Machine
- MAC Medium Access Control
- MBSFN RS Multicast-Broadcast Single Frequency Network Reference Symbol
- MC Multi-Connectivity
- MCE Multi-Cell/Multicast Coordination Entity
- MCOT Maximum Channel Occupancy Time
- MDT Minimization of Drive Tests
- MeNB Master Enhanced or Evolved Node B
- MME Mobility Management Entity
- ms Millisecond
- NACK Negative Acknowledgement
- NB-IoT NarrowBand Internet of Things
- ns Nanosecond
- NX Next Generation Fifth Generation Radio Access Technology
- PCC Primary Component Carrier
- PCell Primary Cell
- PDN Packet Data Network
- P-GW Packet Data Network Gateway
- PSC Primary Serving Cell
- PSCC Primary Secondary Component Carrier
- PSCell Primary Secondary Cell
- PSS Primary Synchronization Signal
- psTAG Primary Secondary Timing Advance Group
- pTAG Primary Timing Advance Group
- PUCCH Physical Uplink Control Channel
- RAN Radio Access Network
- RAT Radio Access Technology
- RF Radio Frequency
- RLM Radio Link Monitoring
- RRC Radio Resource Control
- RRH Remote Radio Head
- RRU Remote Radio Unit
- RX Receiver
- SCC Secondary Component Carrier
- SCell Secondary Cell
- SeNB Secondary Enhanced or Evolved Node B
- S-GW Serving Gateway
- SON Self-Organizing Network
- SSC Secondary Serving Cell
- SSS Secondary Synchronization Signal
- sTAG Secondary Timing Advance Group
- TA Timing Advance
- TAG Timing Advance Group
- TAT timeAlignmentTimer
- TDD Time Division Duplex
- TS Technical Specification
- TTI Transmit Time Interval
- TX Transmitter
- UE User Equipment
- USB Universal Serial Bus
- UTRA Universal Terrestrial Radio Access Those skilled in the art will recognize improvements and modifications to the embodiments of the present disclosure. All such improvements and modifications are considered within the scope of the concepts disclosed herein and the claims that follow.

What is claimed is:

1. A method of operation of a User Equipment, UE, comprising:
    determining a transmission timing difference, Δ, between a first cell that operates on a first carrier and a second cell that operates on a second carrier, wherein Clear Channel Assessment, CCA, is required to be performed on at least one of a first channel in which the first carrier is located and a second channel in which the second carrier is located before the UE is permitted to transmit, where the transmission timing difference is based on autonomous adjustment by the UE based on downlink cell timing of any of the first cell or the second cell; and
    using the transmission timing difference, Δ, for one or more operational tasks of the UE; the transmission timing difference, Δ, being determined when the first channel and the second channel are available at the UE for transmission of signals on the first cell and the second cell, respectively;
    where using the transmission timing difference, Δ, for the one or more operational tasks of the UE comprises stopping transmission on at least one of the first cell and the second cell if the transmission timing difference, Δ, is greater than a threshold.

2. The method of claim 1 wherein: CCA is required to be performed on the first channel in which the first carrier is located before the UE is permitted to transmit on the first cell; CCA does not need to be performed on the second channel in which the second carrier is located before the UE is permitted to transmit on the second cell; and using the transmission timing difference, Δ, for the one or more operational tasks of the UE comprises stopping transmission on the first cell if the transmission timing difference, Δ, is greater than the threshold.

3. The method of claim 1 wherein: CCA is required to be performed on the first channel in which the first carrier is located before the UE is permitted to transmit on the first cell; and using the transmission timing difference, Δ, for the one or more operational tasks of the UE comprises stopping transmission on the first cell if the transmission timing difference, Δ, is greater than the threshold.

4. The method of claim 1 wherein the first cell is configured as a secondary cell of the UE and the second cell is configured as a primary cell of the UE.

5. The method of claim 1 wherein the first cell is configured as a secondary cell of the UE and is in a first timing advance group and the second cell is configured as a primary cell of the UE and is in a second timing advance group.

6. The method of claim 1 wherein the first cell is configured as a first secondary cell of the UE and is in a first timing advance group and the second cell is configured as a second secondary cell of the UE and is in a second timing advance group.

7. The method of claim 1 wherein determining the transmission timing difference, Δ, comprises determining the transmission timing difference, Δ, when both the first channel and the second channel are available for transmission by the UE on the first cell and the second cell, respectively.

8. The method of claim 1 wherein determining the transmission timing difference, Δ, comprises determining the transmission timing difference, Δ, after a CCA result for the at least one of the first channel and the second channel is known and the CCA result is that the at least one of the first channel and the second channel is available for transmission by the UE.

9. The method of claim 1 wherein determining the transmission timing difference, Δ, comprises not determining the transmission timing difference, Δ, after a CCA result for the at least one of the first channel and the second channel is known and the CCA result is that the at least one of the first channel and the second channel is not available for transmission by the UE.

10. A User Equipment, UE, for a cellular communications network, comprising:
one or more processors; and memory storing instructions executable by the one or more processors whereby the UE is operable to: determine a transmission timing difference, Δ, between a first cell that operates on a first carrier and a second cell that operates on a second carrier, wherein Clear Channel Assessment, CCA, is required to be performed on at least one of a first channel in which the first carrier is located and a second channel in which the second carrier is located before the UE is permitted to transmit,
where the transmission timing difference is based on autonomous adjustment by the UE based on downlink cell timing of any of the first cell or the second cell; and
use the transmission timing difference, Δ, for one or more operational tasks of the UE; the transmission timing difference, Δ, being determined when the first channel and the second channel are available at the UE for transmission of signals on the first cell and the second cell, respectively;
where using the transmission timing difference, Δ, for the one or more operational tasks of the UE comprises stopping transmission on at least one of the first cell and the second cell if the transmission timing difference, Δ, is greater than a threshold.

11. The UE of claim 10 wherein: CCA is required to be performed on the first channel in which the first carrier is located before the UE is permitted to transmit on the first cell; CCA does not need to be performed on the second channel in which the second carrier is located before the UE is permitted to transmit on the second cell; and using the transmission timing difference, Δ, for the one or more operational tasks of the UE comprises stopping transmission on the first cell if the transmission timing difference, Δ, is greater than the threshold.

12. The UE of claim 10 wherein: CCA is required to be performed on the first channel in which the first carrier is located before the UE is permitted to transmit on the first cell; and using the transmission timing difference, Δ, for the one or more operational tasks of the UE comprises stopping transmission on the first cell if the transmission timing difference, Δ, is greater than the threshold.

13. The UE of claim 12 wherein the first cell is configured as a secondary cell of the UE and the second cell is configured as a primary cell of the UE.

14. The UE of claim 12 wherein the first cell is configured as a secondary cell of the UE and is in a first timing advance group and the second cell is configured as a primary cell of the UE and is in a second timing advance group.

15. The UE of claim 12 wherein the first cell is configured as a first secondary cell of the UE and is in a first timing advance group and the second cell is configured as a second secondary cell of the UE and is in a second timing advance group.

16. The UE of claim 10 wherein determining the transmission timing difference, Δ, comprises determining the transmission timing difference, Δ, when both the first channel and the second channel are available for transmission by the UE on the first cell and the second cell, respectively.

17. The UE of claim 10 wherein determining the transmission timing difference, Δ, comprises determining the transmission timing difference, Δ, after a CCA result for the at least one of the first channel and the second channel is known and the CCA result is that the at least one of the first channel and the second channel is available for transmission by the UE.

18. The UE of claim 10 wherein determining the transmission timing difference, Δ, comprises not determining the transmission timing difference, Δ, after a CCA result for the at least one of the first channel and the second channel is known and the CCA result is that the at least one of the first channel and the second channel is not available for transmission by the UE.

19. The UE of claim 10 wherein determining the transmission timing difference, Δ, comprises not determining the transmission timing difference, Δ, during a deferral time or during a backoff time for CCA.

20. The UE of claim 10 wherein determining the transmission timing difference, Δ, comprises determining the transmission timing difference, Δ, during a channel occupancy time of the first cell and the second cell.

21. The UE of claim 10 wherein determining the transmission timing difference, Δ, comprises adapting a time at which the transmission timing difference, Δ, is determined to one or more subframes for which a CCA result for the at least one of the first channel and the second channel is that the at least one of the first channel and the second channel is available for transmission by the UE.

22. The UE of claim 10 wherein using the transmission timing difference, Δ, for the one or more operational tasks of the UE comprises: performing at least one task if the transmission timing difference, Δ, is greater than the threshold; and informing a network node that the UE has performed the at least one task.

23. The UE of claim 10 further comprising obtaining at least one requirement and/or condition for the transmission timing difference, Δ, for a pair of cells comprising the first cell on the first carrier and the second cell on the second carrier.

24. The UE of claim 23 wherein determining the transmission timing difference, $\Delta$, comprises determining the transmission timing difference, $\Delta$, when the first channel and the second channel are available for transmission of signals on the first cell and the second cell, respectively, based on the at least one requirement and/or condition for the transmission timing difference, $\Delta$, for the pair of cells comprising the first cell on the first carrier and the second cell on the second carrier.

25. The UE of claim 10 further comprising determining a need for determining the transmission timing difference, $\Delta$, for at least one pair of cells comprising the first cell on the first carrier and the second cell on the second carrier.

26. The UE of claim 10 wherein the first carrier and the second carrier are carriers configured for the UE for inter-band carrier aggregation.

* * * * *